H. N. HAGEN.
REVOLVING BAR HARROW.
APPLICATION FILED JAN. 15, 1919.
1,319,955.
Patented Oct. 28, 1919.
2 SHEETS—SHEET 1.
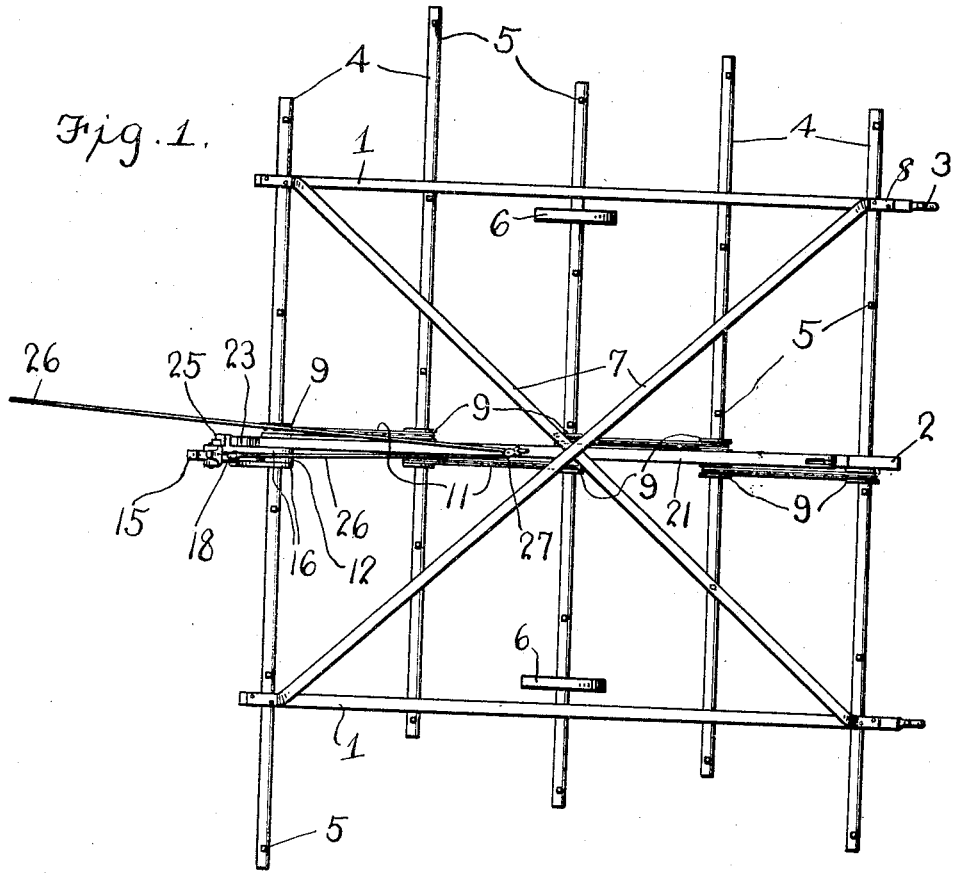
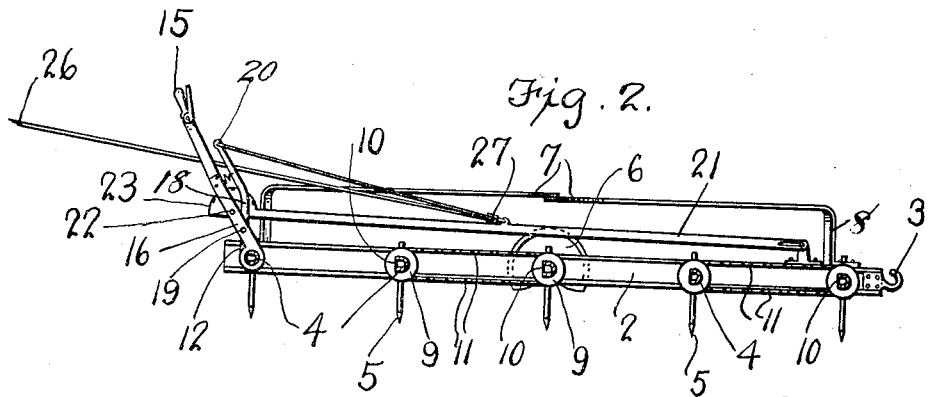
Witnesses
L. B. James
Inventor
H. N. Hagen
By Victor J. Evans
Attorney

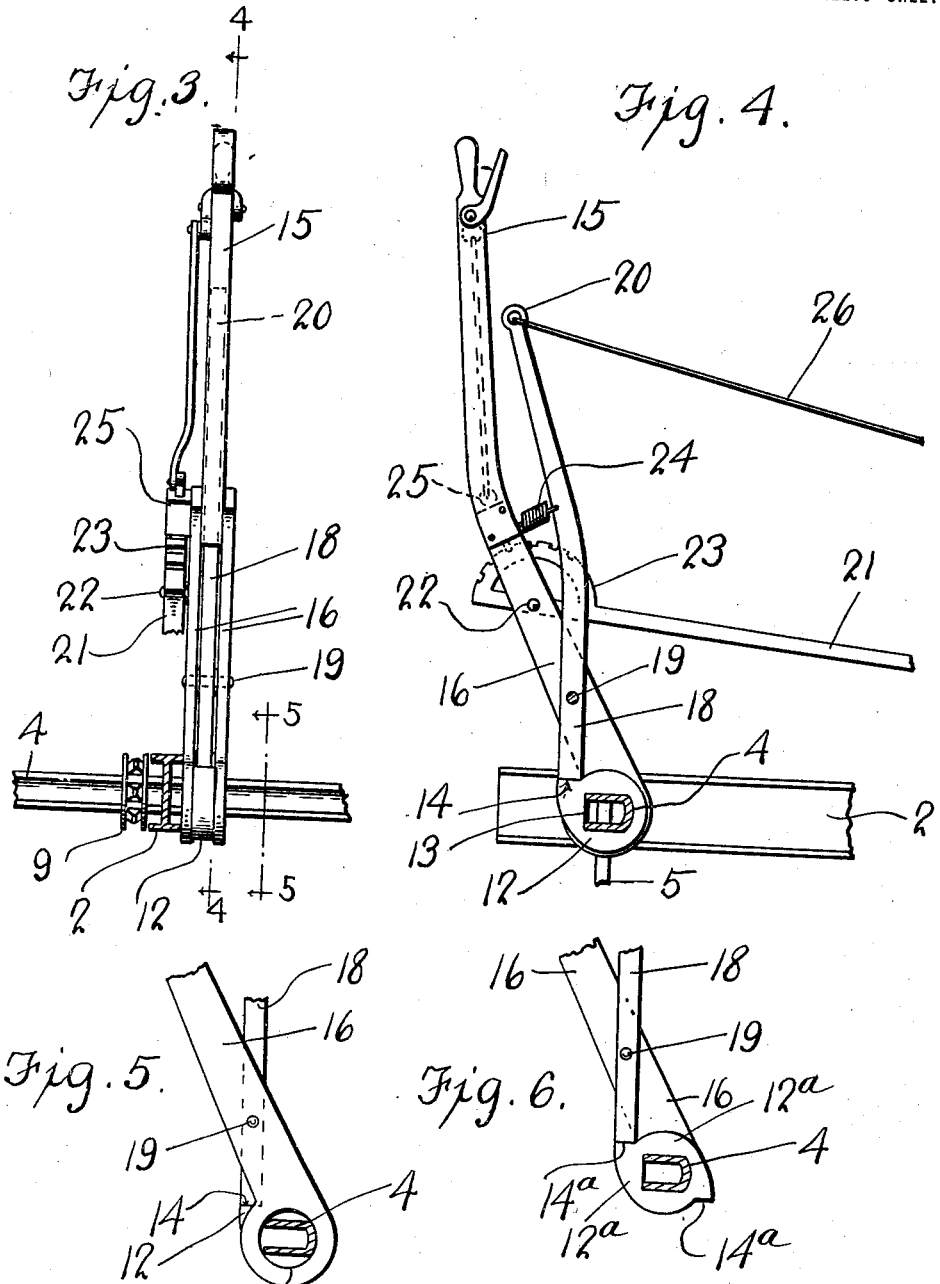

UNITED STATES PATENT OFFICE.

HERMAN N. HAGEN, OF WILBUR, WASHINGTON.

REVOLVING-BAR HARROW.

1,319,955.  Specification of Letters Patent.  Patented Oct. 28, 1919.

Application filed January 15, 1919. Serial No. 271,305.

*To all whom it may concern:*

Be it known that I, HERMAN N. HAGEN, a citizen of the United States, residing at Wilbur, in the county of Lincoln and State of Washington, have invented new and useful Improvements in Revolving-Bar Harrows, of which the following is a specification.

This invention relates to improvements in harrows and particularly with reference to the provision of revoluble harrow toothed bars and means to enable said bars to revolve when trash has gathered on the teeth and thereby clear the teeth automatically without the necessity of lifting the harrow for this purpose.

With the above and other objects in view, the invention consists in the construction, combination and arrangement of devices hereinafter described and claimed.

In the accompanying drawings:

Figure 1 is a plan of a harrow embodying my improvements.

Fig. 2 is a longitudinal sectional view of the same.

Fig. 3 is a detail rear elevation.

Figs. 4 and 5 are detail sectional views on the planes indicated by the lines 4—4 and 5—5 respectively of Fig. 3.

Fig. 6 is a detail sectional view showing the modification.

The harrow may be of any suitable construction and in accordance with my invention is provided with revoluble cross bars which carry the teeth. For the purposes of this specification the harrow is shown provided with longitudinally arranged side and central bars 1, 2 which are in practice I-bars and the side bars 1 are provided at their front ends with draft attaching means 3 enabling the harrow to be drawn either by a team or by a tractor. The cross bars 4 are here shown as U bars and are mounted in the bars 1, 2 for rotation and are provided with the usual harrow teeth 5. One of the revoluble cross bars is also provided with irons 6 which bear on the ground and cause said bar to turn when desired as hereinafter described. Braces 7 are also provided which have downturned ends 8 secured to the front and rear cross bars in the corners of the harrow and so that the braces are raised a sufficient distance above the cross bars to clear and permit the turning of the cross bars and their harrow teeth.

Each cross bar is provided with a sprocket wheel 9 having a non-circular central opening 10 through which the bar is passed and so that the sprocket wheels are fitted on the harrow bars fixedly and for rotation only with the harrow bars, the openings 10 being here shown as substantially semi-circular in shape to fit the U bars 4. I would have it understood, however, that the bars 4 may be of any suitable form, cross sectionally, and any suitable means may be employed to secure the sprocket wheels thereon. As here shown the sprocket wheels are peripherally grooved, their teeth being in the bottoms of the grooves. The harrow bars are connected together in pairs by endless sprocket wheels 9 as shown and, hence, the harrow bars 4 are connected together for turning movement in unison.

On the rear harrow bar 4, at the center thereof is secured a stop member which is here shown as a disk 12 having a non-circular opening 13 through which said harrow bar extends and also having a peripheral shoulder 14. A lever 15 is provided which is bifurcated at its lower end to provide arms 16 which are arranged on opposite sides of the stop member 12 and have circular openings 17 through which the rear harrow bar 4 extends and so that the lever is free to turn on said harrow bar and independently thereof. A dog 18 is pivotally mounted as at 19 between the arms 16 of the lever. The lower end of said dog is normally engaged with the stop shoulder 14 and said dog has an upwardly and rearwardly extending lever arm 20. A longitudinally arranged rod 21 has its front end secured to the bar 2 of the harrow and is pivotally connected near its rear end to the lever 15 by a bolt 22. Said rod is also provided at its rear end with a segment 23 which has a toothed portion which is concentrical with the pivot 22. A spring 24 is arranged between the lever 15 and the arm 20 of the dog and serves to normally hold the dog in engagement with the stop shoulder 14. Said lever 15 also has a spring pressed dog 25 of usual construction to engage any of the teeth of the segment and thereby lock said lever in any desired adjusted position.

The cross bar 4 of the harrow may be partly turned by means of the lever 15 to arrange the harrow teeth in any desired position, either vertical or inclined, as may be desired, the dog 18 and stop member 12 turning with the rear harrow bar when the lever 15 is thus adjusted and the dog 25 being, of course, disengaged from the segment 23 while effecting such adjustment and being then reëngaged with the segment to lock the lever 15 and, hence, also the harrow bars in the required adjusted position.

When the teeth of the harrow bars become clogged with trash and it is desired to clear them, this can be effected by turning the dog 18, by means of its arm 20, a sufficient distance to cause the dog to disengage the shoulder 14. Thereupon the irons 6, owing to the forward movement of the harrow, cause the harrow bars 4 to make a complete revolution, thus clearing the teeth and returning them to their original position, when the dog 18 is then reëngaged by the stop shoulder 14 and the harrow bars locked against further turning movement. A cord 26 may be provided for operating the dog 18 and is here shown as attached to the arm 20 thereof and is also engaged with a pulley 27 which is mounted on the rod 21.

If it be desired to permit the harrow bars to turn through only one-half of a revolution, this can be effected by substituting a stop disk or member 12ª for the member 12, said disk 12ª being provided with a pair of diametrically oppositely arranged stop shoulders 14ª.

While I have herein shown and described a preferred embodiment of my invention, I would have it understood that changes may be made in the form, proportion and construction of the several parts without departing from the spirit of my invention and within the scope of the appended claims.

Having thus described my invention, I claim:

1. In a harrow, a toothed bar mounted for revolution and provided with a stop element, an adjusting lever pivotally mounted on said bar for turning movement independently thereof, a rod fixedly connected to the harrow, pivotally connected to said lever and having a segment, said lever having a dog to engage said segment, and a second dog mounted on said lever and arranged to engage the stop element of said harrow bar.

2. In a harrow, a toothed bar mounted for revolution and provided with a stop element, an adjusting lever pivotally mounted on said bar for turning movement independently thereof, a rod fixedly connected to the harrow, pivotally connected to said lever and having a segment, said lever having a dog to engage said segment, and a second dog pivotally mounted on said lever and arranged to engage the stop element of said harrow bar.

3. In a harrow, a toothed bar mounted for rotation and having a stop element, an adjusting lever pivotally mounted on said bar for turning movement independently thereof, means to hold said lever in adjusted position and a dog mounted on said lever and arranged to engage the stop element of said bar.

4. In a harrow, a plurality of toothed bars mounted for rotation, connections between said bars to cause said bars to turn in unison and prevent independent turning of any of said bars, a stop member element on one of said bars, an adjusting lever pivotally mounted on said bar, a rod fixedly connected to the harrow and pivotally connected to said lever, means to lock said lever to said rod at any desired adjustment of said lever and a dog mounted on said lever and arranged to engage the stop element of said bar.

In testimony whereof I affix my signature.

HERMAN N. HAGEN.

Copies of this patent may be obtained for five cents each, by addressing the "Commissioner of Patents, Washington, D. C."